United States Patent
Guthrie et al.

(10) Patent No.: US 7,306,638 B2
(45) Date of Patent: Dec. 11, 2007

(54) CHEMICAL MECHANICAL POLISHING PROCESS FOR 2.45T COFENI STRUCTURES OF THIN FILM MAGNETIC HEADS

(75) Inventors: Hung-Chin Guthrie, Saratoga, CA (US); Ming Jiang, San Jose, CA (US); Nick Lara, Gilriy, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 197 days.

(21) Appl. No.: 10/931,846

(22) Filed: Aug. 31, 2004

(65) Prior Publication Data

US 2006/0042173 A1    Mar. 2, 2006

(51) Int. Cl.
 *C09G 1/02*    (2006.01)
 *C09G 1/04*    (2006.01)
(52) U.S. Cl. .............. 51/307; 51/309; 106/3
(58) Field of Classification Search .......... 51/307, 51/309; 106/3; 438/690–694
See application file for complete search history.

(56) References Cited

U.S. PATENT DOCUMENTS

| | | | |
|---|---|---|---|
| 5,403,672 A | 4/1995 | Urasaki et al. ............ 428/607 |
| 5,689,879 A | 11/1997 | Urasaki et al. ............ 29/846 |
| 5,699,605 A | 12/1997 | Amin et al. ............ 29/603.14 |
| 5,811,355 A | 9/1998 | Jordan ............ 438/692 |
| 5,940,956 A | 8/1999 | Jordan ............ 29/603.16 |
| 6,447,563 B1 * | 9/2002 | Mahulikar ............ 51/309 |
| 6,533,962 B1 | 3/2003 | Tulka et al. ............ 252/389.1 |
| 2003/0099069 A1 | 5/2003 | Kagami et al. ............ 360/313 |
| 2003/0234184 A1 * | 12/2003 | Liu et al. ............ 205/680 |
| 2004/0043702 A1 | 3/2004 | Singh ............ 451/36 |
| 2004/0092102 A1 | 5/2004 | Li et al. ............ 438/689 |

* cited by examiner

*Primary Examiner*—Michael Marcheschi
(74) *Attorney, Agent, or Firm*—Robert O. Guillot; Intellectual Property Law Offices

(57) ABSTRACT

The present invention is directed to methods for polishing and cleaning a wafer having CoFeNi structures within alumina fill to achieve corrosion-free, smooth, and planar surface. A preferred chemical mechanical polishing (CMP) method includes a CMP polishing compound including alumina abrasive particulates, 1H-Benzotriazole (BTA), and hydrogen peroxide ($H_2O_2$) in a concentration working range of 4% to 12%. In a preferred embodiment the $H_2O_2$ concentration is approximately 6% and the pH is approximately 4.0 at polishing pressure 6 psi. A cleaning solution for CoFeNi structures in alumina fill of the present invention preferably includes 4-Methyl-1H-Benzotriazole, 5-Methyl-1H-Benzotriazole, hydrogenated 4-Methyl-1H-Benzotriazole, hydrogenated 5-Methyl-1H-Benzotriazole, sodium octanoate, and water.

10 Claims, 1 Drawing Sheet

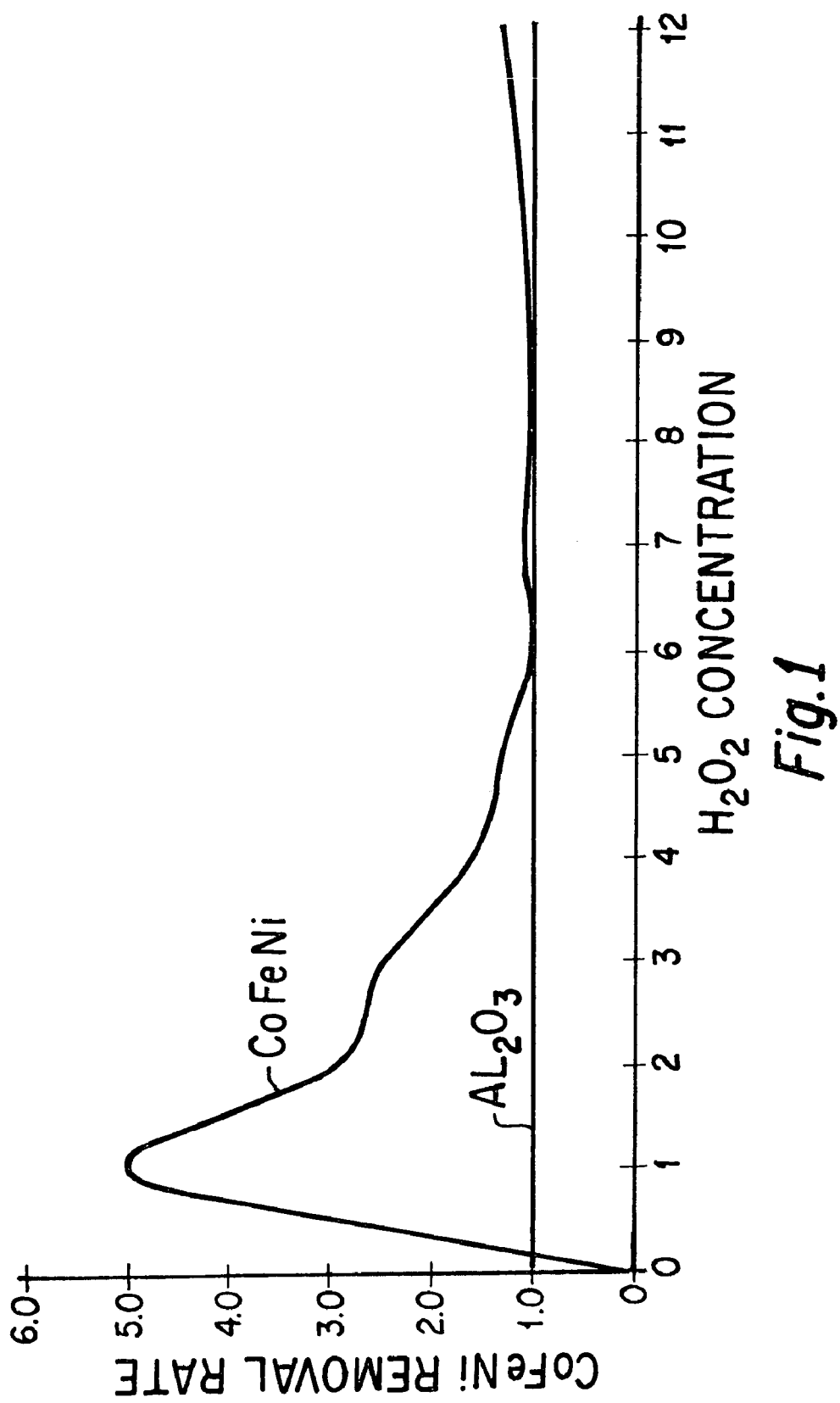

CHEMICAL MECHANICAL POLISHING PROCESS FOR 2.45T COFENI STRUCTURES OF THIN FILM MAGNETIC HEADS

BACKGROUND OF THE INVENTION

1. Field of the Invention

The present invention relates generally to chemical mechanical polishing (CMP) compounds and methods and post CMP cleaning solutions and methods, and particularly to the polishing and cleaning of CoFeNi structures such as magnetic poles fabricated within alumina fill layers during magnetic head fabrication.

2. Description of the Prior Art

Magnetic heads for devices such as hard disk drives typically include magnetic pole structures that are utilized to generate magnetic fields for writing magnetic data bits into the magnetic media of a hard disk of a hard disk drive. Such magnetic poles are typically comprised of NiFe. In a typical prior art magnetic pole fabrication process, utilizing photolithographic techniques, a magnetic pole structure is electroplated within a trench that is photolithographically formed within a photoresist layer. Following the electroplating of the magnetic pole piece, the photoresist is removed, such as with the use of a chemical stripper, and a layer of alumina is then deposited to fill the field surrounding the electroplated pole piece. Thereafter, a chemical mechanical polishing (CMP) step is typically undertaken to create a flat surface for subsequent magnetic head fabrication steps.

In such a CMP step it is desirable that the polishing be accomplished such that the material removal rate of the alumina and the NiFe pole piece be approximately equal, such that a flat polished surface is obtained. Where the material removal rate of either the alumina or the NiFe pole piece differs, an undesirable step will be created at the surface interface of the alumina and NiFe pole piece.

A CMP processing step involves the use of a polishing slurry including abrasive particulates and liquid components that typically include water, a corrosion inhibitor such as BTA (1H-benzotriazole) and an oxidizer such as ammonium persulfate (APS). A biocide chemical is typically added to prolong the shelf life of the polishing compound. In the prior art for NiFe pole structures a polishing slurry is utilized where the material removal rate of the NiFe pole piece and alumina field are approximately equal, such that no undesirable polishing steps are created.

Following a CMP step it is necessary to clean the polished wafer surface to remove all traces of polishing slurry and particulates. A typical prior art cleaning solution for a wafer having NiFe magnetic pole pieces is ammonium citrate or hydrogen peroxide into which the wafer is dipped for cleaning. Following wafer cleaning, the wafer is rinsed in deionized (DI) water to remove any remaining cleaning solution from the wafer.

Hard disk drives that are currently being developed include data disks having significantly increased areal data storage densities. Smaller magnetic pole structures are necessary to write the smaller magnetic data bits of the higher density data disks, and the high moment magnetic material CoFeNi (2.45 Tesla) recently is being considered for replacing NiFe as a pole material to increase the ability for high density writing. However, CoFeNi is more chemically active than NiFe. With current existing NiFe CMP processes, the chemical attack upon the CoFeNi is very strong and causes serious corrosion of the CoFeNi surface. Also, the polishing of the CoFeNi and alumina is uneven, and unwanted steps are created between the surfaces of the CoFeNi and the alumina when prior art CMP slurries and parameters for NiFe are utilized when polishing the CoFeNi magnetic poles. Additionally, it has been found that the prior art ammonium citrate cleaning solutions also cause unwanted corrosion of the CoFeNi magnetic pole pieces.

There is therefore a need for new polishing and cleaning formulations for use with CoFeNi magnetic pole structures in the fabrication of magnetic heads.

SUMMARY OF THE INVENTION

The present invention is directed to methods for polishing and cleaning a wafer substrate having CoFeNi structures within alumina fill. A preferred chemical mechanical polishing (CMP) method includes a CMP polishing compound including alumina abrasive particulates, 1H-Benzotriazole in a concentration range of 80% to 95% by volume in the polishing slurry, $H_2O_2$ in a concentration range of 4% to 12% by volume, a pH in the range of 4 to 7. In the CMP method, a wafer to be polished is placed in a rotatable carrier and a polishing pad is placed upon a rotatable table, and the CMP polishing compound is utilized to polish the wafer. The rotatable carrier is preferably rotated at between 30 rpm and 80 rpm, and the table is preferably rotated at between 20 rpm and 70 rpm. A polishing force applied to said wafer is in the range of 4 psi to 8 psi. In a preferred embodiment the $H_2O_2$ concentration is approximately 6%, and the ph is approximately 4.0. A cleaning solution for CoFeNi structures an alumina fill of the present invention preferably includes 4-Methyl-1H-Benzotriazole in a concentration range of from 1% to 5% by weight, 5-Methyl-1H-Benzotriazole in a concentration range of from 1% to 5%, hydrogenated 4-Methyl-1H-Benzotriazole in a concentration range of from 1% to 5%, hydrogenated 5-Methyl-1H-Benzotriazole in a concentration range of from 1% to 5%, sodium octanoate in a concentration range of from 5% to 10%, and water in a concentration range of from 65% to 95%. The cleaning solution is typically used within a substrate cleaning device in which the cleaning solution is diluted with DI water to create an applied solution having a range of from 0.1% to 10% by volume of the cleaning solution. A preferred applied solution has approximately 5% by volume of the cleaning solution.

It is an advantage of the chemical mechanical polishing (CMP) method of the present invention that CoFeNi structures within alumina fill are polished with a corrosion free, smooth planar surface between the CoFeNi structures and the alumina fill.

It is an advantage of the cleaning solution of the present invention that a wafer having CoFeNi structures within alumina fill is cleaned without any corrosion of the CoFeNi structure.

These and other features and advantages of the present invention will no doubt become apparent to those skilled in the art upon reading the following detailed description which makes reference to the several figures of the drawing.

IN THE DRAWINGS

The following drawings are not made to scale as an actual device, and are provided for illustration of the invention described herein.

FIG. 1 is a graphical depiction of the effect of varying the $H_2O_2$ concentration upon the material removal rate of alumina and CoFeNi in a CMP step.

DETAILED DESCRIPTION OF THE PREFERRED EMBODIMENTS

Magnetic heads for hard disk drives typically include magnetic pole structures that are utilized to generate magnetic fields for writing magnetic data bits into the magnetic media of a hard disk of a hard disk drive. Hard disk drives that are currently being developed have significantly increased areal data storage densities, and smaller magnetic pole structures are necessary to write the smaller magnetic data bits of the higher density data disks. Additionally, a high magnetic moment material CoFeNi (2.45 Tesla) recently is being considered for replacing NiFe as the magnetic pole material to increase the writing ability for high density writing in magnetic heads.

In a typical magnetic pole fabrication process, utilizing photolithographic techniques, a magnetic pole structure is electroplated within a trench that is photolithographically formed within a photoresist layer. Following the electroplating of the magnetic pole piece, the photoresist is removed, such as within the use of a chemical stripper, and a layer of alumina is then deposited to fill the field surrounding the electroplated pole piece. Thereafter, a chemical mechanical polishing (CMP) step is typically undertaken to create a flat surface for subsequent magnetic head fabrication steps. Then, following the CMP step a wafer cleaning step is undertaken to wash the CMP slurry from the wafer.

In such a CMP process it is desirable that the polishing be accomplished such that the material removal rate of the alumina and the magnetic pole piece be approximately equal, such that a flat polished surface is obtained. Where the material removal rate of either the alumina or the magnetic pole piece differs, an undesirable step will be created at the surface interface of the alumina and magnetic pole piece. With regard to the prior art NiFe magnetic pole material, the CMP slurry chemistries and process parameters have been long developed and are well known. It was therefore natural to utilize the prior art NiFe CMP slurry chemistries and process parameters when conducting CMP for a CoFeNi magnetic pole piece within an alumina fill. However, CoFeNi is more chemically active than NiFe. Using the current NiFe CMP process, the chemical attack upon the CoFeNi is very strong and causes serious corrosion of the CoFeNi surface. Also, unwanted steps are created where prior art CMP slurries and parameters for NiFe magnetic poles are utilized when polishing the CoFeNi magnetic poles within an alumina fill.

A proper balance between chemical activity and mechanical action is very important to achieve a planar surface finish in CoFeNi CMP. The OMP process of the present invention utilizes an $Al_2O_3$ abrasive slurry (particulate size of approximately 130 nm, pH in the range of 4 to 7 and preferably approximately 4) with BTA (1 H-benzotriazole) corrosion inhibitor (in a range of from 80% to 95%, and preferably approximately 90% concentration by volume in the polishing slurry) and $H_2O_2$, with a balanced mechanical action (such as polishing pressure and speed) and chemical material removal action from the slurry to reach a desired surface smoothness and planarity. A biocide such as Isothiazolone is preferably included in a range of from 1% to 3% and preferably approximately 2%. The $H_2O_2$ concentration in slurry is significant in reaching a planar surface and avoiding CoFeNi corrosion, as is next described with the aid if FIG. 1.

FIG. 1 is a graphical depiction of the effect of varying the $H_2O_2$ concentration upon the material removal rate of alumina and CoFeNi, where the alumina removal rate is normalized at 1.0. As can be seen in FIG. 1, initially the alumina is removed much faster than the CoFeNi without any $H_2O_2$ in the slurry. When the $H_2O_2$ concentration is increased, the alumina removal rate is generally unchanged, but the CoFeNi removal rate rises to a peak of about 5 times the alumina removal rate. It then declines, and then stabilizes at higher $H_2O_2$ concentrations where the material removal rates of the alumina and CoFeNi are approximately equal. By variation of the $H_2O_2$ concentration we can adjust the polishing rate of CoFeNi and alumina to obtain a corrosion free and planar CoFeNi surface (to $Al_2O_3$) in a single CoFeNi CMP step. The optimum concentration range by volume for $H_2O_2$ in this process is 4-12% with a preferred value of approximately 6%.

With regard to mechanical polishing parameters, a typical CMP processing device includes a rotating polishing table having a disk polishing pad disposed thereon and the wafer to be polished is mounted upon a rotatable wafer carrying device. In the present invention the carrier is rotated at a particular speed, such as from 30 rpm to 80 rpm and preferably approximately 45 rpm and the table is rotated at a speed such as from 20 rpm to 70 rpm and preferably approximately 55 rpm where a pressure in the range of 4 psi to 8 psi and preferably approximately 6 psi is applied between the disk surface and the polishing pad.

Thereafter, a cleaning process that follows the CMP process is important to achieve a completely corrosion-free CoFeNi surface. A commonly used cleaning process for the prior art NiFe-alumina CMP process utilizes ammonium citrate for cleaning, followed by DI water rinsing. The cleaning solution of the present invention contains Methyl Benzotriazole, Sodium Octanoate, and water. The hydrogenated Methyl Benzotriazole compositions provide improved passivation and persistence. This is important for high moment CoFeNi with less Ni (1%) and/or CoFe material.

For high moment CoFeNi and CoFe post polishing cleaning, dipping tests (without DNS wafer cleaning) have shown that ammonium citrate caused corrosion, but the cleaning solution of the present invention as well as DI water and $H_2O_2$ cleaning solution did not cause corrosion. A further DNS wafer cleaning study concluded that the cleaning solution of the present invention is much better than DI water and $H_2O_2$ to avoid cleaning corrosion.

TABLE I

| Component | Concentration (by weight) | |
|---|---|---|
| | Range | Preferred |
| 4-Methyl-1H Benzotriazole | 1%–5% | 3% |
| 5-Methyl-1H-Benzotriazole | 1%–5% | 3.5% |
| Hydrogenated 4-Methyl-1H-Benzotriazole | 1%–5% | 3% |
| Hydrogenated 5-Methyl-1H-Benzotriazole | 1%–5% | 3.5% |
| Sodium Octanoate | 5%–10% | 7% |
| Water | 65%–95% | 80% |

This cleaning solution provides corrosion protection for CoFeNi structures during the cleaning of thin film magnetic head substrates. The cleaning solution is typically used within a substrate cleaning device in which the cleaning solution is diluted with DI water to create an applied solution having a range of from 0.1% to 10% by volume of the cleaning solution. A preferred applied solution has approximately 5% by volume of the cleaning solution. Additionally, the cleaning solution can be added to a CMP slurry to provide added corrosion protection, as well as to other cleaning solutions to provide added corrosion protection.

While the present invention has been shown and described with regard to certain preferred embodiments, it is to be understood that modifications in form and detail will no doubt be developed by those skilled in the art upon reviewing this disclosure. It is therefore intended that the following claims cover all such alterations and modifications that nevertheless include the true spirit and scope of the inventive features of the present invention.

We claim:

1. A chemical mechanical polishing (CMP) compound for CoFeNi structures in alumina fill, comprising:
   alumina abrasive particulates in a polishing slurry;
   1H-Benzotriazole in a concentration range of 80% to 95% by volume in said polishing slurry;
   $H_2O_2$ in a concentration range of 4% to 12% by volume in said polishing slurry; a pH in the range of 4 to 7.

2. A CMP compound as described in claim 1 wherein said $H_2O_2$ concentration is approximately 6%.

3. A CMP compound as described in claim 2 wherein said 1H-Benzotriazole concentration is approximately 90%.

4. A CMP compound as described in claim 3 wherein the pH is 4.

5. A CMP compound as described in claim 1 further comprising a biocide in the range of from 1% to 3% by volume in said polishing slurry.

6. A CMP compound as described in claim 5 wherein said $H_2O_2$ concentration is approximately 6%.

7. A chemical mechanical polishing (CMP) compound for CoFeNi structures in alumina fill, consisting of:
   alumina abrasive particulates in a polishing slurry;
   1H-Benzotriazole in a concentration range of 80% to 95% by volume in said polishing slurry;
   $H_2O_2$ in a concentration range of 4% to 12% by volume in said polishing slurry;
   a pH in the range of 4 to 7.

8. A CMP compound as described in claim 7 wherein said $H_2O_2$ concentration is approximately 6%.

9. A CMP compound as described in claim 8 wherein said 1H-Benzotriazole concentration is approximately 90%.

10. A CMP compound as described in claim 9 wherein the pH is 4.

* * * * *